United States Patent
Wright et al.

(10) Patent No.: US 7,315,538 B2
(45) Date of Patent: Jan. 1, 2008

(54) METHODS AND SYSTEMS FOR PROVIDING NETWORK ACCESS SERVICE UTILIZING MULTIPLE ASYMMETRIC DSL MODEMS PER SERVICE POINT

(75) Inventors: Steven A. Wright, Roswell, GA (US); Thomas Anschutz, Conyers, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 854 days.

(21) Appl. No.: 10/636,432

(22) Filed: Aug. 7, 2003

(65) Prior Publication Data

US 2005/0030975 A1 Feb. 10, 2005

(51) Int. Cl.
*H04L 12/66* (2006.01)
(52) U.S. Cl. ............... 370/352; 370/484; 370/485; 375/222
(58) Field of Classification Search ........... 370/352, 370/484, 485, 487, 494, 495; 375/222
See application file for complete search history.

(56) References Cited

U.S. PATENT DOCUMENTS

| | | | |
|---|---|---|---|
| H1175 H | 4/1993 | Giorgio | 370/536 |
| 5,390,239 A | 2/1995 | Morris et al. | 379/93.08 |
| 5,617,417 A | 4/1997 | Sathe et al. | 370/394 |
| 6,002,670 A | 12/1999 | Rahman et al. | 370/238 |
| 6,198,749 B1 | 3/2001 | Hui et al. | 370/463 |
| 6,577,653 B1 | 6/2003 | Rochberger et al. | 370/536 |
| 6,798,769 B1 | 9/2004 | Farmwald | 370/352 |
| 6,834,058 B1 | 12/2004 | Moyal et al. | 370/503 |
| 7,054,376 B1 | 5/2006 | Rubinstain et al. | 375/261 |
| 7,154,911 B2 * | 12/2006 | Counterman | 370/484 |
| 7,177,284 B2 | 2/2007 | Peleg et al. | 370/252 |
| 2003/0036352 A1 | 2/2003 | Deguchi et al. | 455/41 |
| 2003/0103559 A1 * | 6/2003 | Palm | 375/222 |
| 2005/0030975 A1 | 2/2005 | Wright et al. | 370/468 |
| 2006/0098573 A1 | 5/2006 | Beer et al. | 370/230 |

OTHER PUBLICATIONS

U.S. Appl. No. 10/636,366 filed Aug. 7, 2003 entitled "Methods and Systems for Aggregating Ethernet Communications".

(Continued)

*Primary Examiner*—Chau Nguyen
*Assistant Examiner*—Kenneth R Hartmann
(74) *Attorney, Agent, or Firm*—Merchant & Gould

(57) ABSTRACT

Methods and systems provide network access service for a subscriber by utilizing multiple asymmetric DSL modems per service point such that the available bandwidth is the aggregation of the multiple asymmetric DSL modems. One asymmetric DSL modem of a service point has a faster upload speed than download speed while another asymmetric DSL modem of the service point has a faster download speed than upload speed. The two asymmetric DSL modems are aggregated together at the service endpoint so that the service endpoint benefits from the upload and download bandwidth available from both asymmetric DSL modems. The two asymmetric DSL modems at one service point communicate with two asymmetric DSL modems aggregated at another service point to complete the exchange of data. The network access service using DSL connectivity may be made symmetric by providing one of the asymmetric DSL modems with an upload speed that is substantially the same as the download speed of the other asymmetric DSL modem, while the download speed of the one is substantially the same as the upload of the other.

25 Claims, 2 Drawing Sheets

OTHER PUBLICATIONS

U.S. Office Action dated May 4, 2007 cited in U.S. Appl. No. 10/636,366.

U.S. Final Action dated Sep. 26, 2007 cited in U.S. Appl. No. 10/636,366.

* cited by examiner

METHODS AND SYSTEMS FOR PROVIDING NETWORK ACCESS SERVICE UTILIZING MULTIPLE ASYMMETRIC DSL MODEMS PER SERVICE POINT

TECHNICAL FIELD

The present invention is related to network access through digital subscriber lines ("DSL"). More particularly, the present invention is related to providing network access service using multiple asymmetric DSL ("ADSL") modems at a single service point.

BACKGROUND

Network access service utilizing DSL provides subscribers with a broadband connection to a service provider network while utilizing the existing copper telephone wiring between the subscriber location and the communications lines of the service provider network. Accordingly, network access utilizing DSL service is an economical way to provide broadband service to subscribers. However, network access service may be provided in an even more economical manner by providing asymmetric DSL ("ADSL") connectivity where the subscriber requires a high-speed download but does not require an upload speed that is as fast.

While the ADSL connectivity for network access service provides the relatively fast data transfer in one direction, subscribers and potential subscribers may require additional speed in the other direction. While other forms of DSL connectivity may provide relatively fast data transfer in both directions, the other forms of DSL connectivity may not be available in that the service provider network is not configured to provide those other types of DSL connectivity to the subscriber or because the other types of DSL connectivity are not considered economical. Thus, the subscriber may not gain network access with adequate throughput in both directions of data transfer since ADSL may be the only feasible option.

SUMMARY

Embodiments of the present invention address these issues and others by providing multiple asymmetric DSL modems at a service point that are aggregated. One of the modems has a faster upload speed than download speed, and another modem has a faster download speed than upload speed. Thus, the available upload speed is the aggregate of the two upload speeds while the available download speed is also the aggregate of the two download speeds.

One embodiment is a method of providing network access service using DSL connectivity. The method involves providing a first asymmetric DSL modem having a faster download speed than upload speed at a first service point and providing a second asymmetric DSL modem having a faster upload speed than download speed at the first service point. The method further involves providing a third asymmetric DSL modem having a faster upload speed than download speed at a second service point where the third asymmetric DSL modem establishes data communication with the first asymmetric DSL modem. The method also involves providing a fourth asymmetric DSL modem having a faster download speed than upload speed at a second service point where the fourth asymmetric DSL modem establishes data communication with the second asymmetric DSL modem. The data communications of the first and second asymmetric DSL modems are aggregated at the first service point, and the data communications of the third and fourth asymmetric DSL modems are aggregated at the second service point.

Another embodiment is a system of providing network access service using DSL connectivity. The system includes a first asymmetric DSL modem having a faster download speed than upload speed at a first service point and a second asymmetric DSL modem having a faster upload speed than download speed at the first service point. The system also includes a third asymmetric DSL modem having a faster upload speed than download speed at a second service point where the third asymmetric DSL modem establishes data communication with the first asymmetric DSL modem. The system further includes a fourth asymmetric DSL modem having a faster download speed than upload speed at a second service point where the fourth asymmetric DSL modem establishes data communication with the second asymmetric DSL modem. A first aggregator device aggregates the data communications of the first and second asymmetric DSL modems at the first service point, and a second aggregator device aggregates the data communications of the third and fourth asymmetric DSL modems at the second service point.

Another embodiment is a system of providing substantially symmetric network access service using DSL connectivity. The system comprises a first asymmetric DSL modem that has a faster download speed than upload speed at a first service point and a second asymmetric DSL modem that has a faster upload speed than download speed at the first service point. The upload speed of the second asymmetric modem is substantially equal to the download speed of the first asymmetric modem, and the download speed of the second asymmetric modem is substantially equal to the upload speed of the first asymmetric modem. The system includes a third asymmetric DSL modem that has a faster upload speed than download speed at a second service point where the third asymmetric DSL modem establishes data communication with the first asymmetric DSL modem. The system includes a fourth asymmetric DSL modem that has a faster download speed than upload speed at a second service point where the fourth asymmetric DSL modem establishes data communication with the second asymmetric DSL modem. The upload speed of the fourth asymmetric modem is substantially equal to the download speed of the third asymmetric modem and the download speed of the fourth asymmetric modem is substantially equal to the upload speed of the third asymmetric modem. A first aggregator device aggregates the data communications of the first and second asymmetric DSL modems at the first service point, and a second aggregator device aggregates the data communications of the third and fourth asymmetric DSL modems at the second service point.

DETAILED DESCRIPTION

Embodiments of the present invention provide for a DSL configuration between service endpoints that allows multiple ADSL modems to be aggregated at each endpoint where one ADSL modem has an upload speed faster than download speed while another ADSL modem has a download speed faster than upload speed. Thus, such aggregation of ADSL modems allows for various bandwidths to be provided for a DSL service including a symmetric bandwidth for both directions of data transfer.

Figure 1:
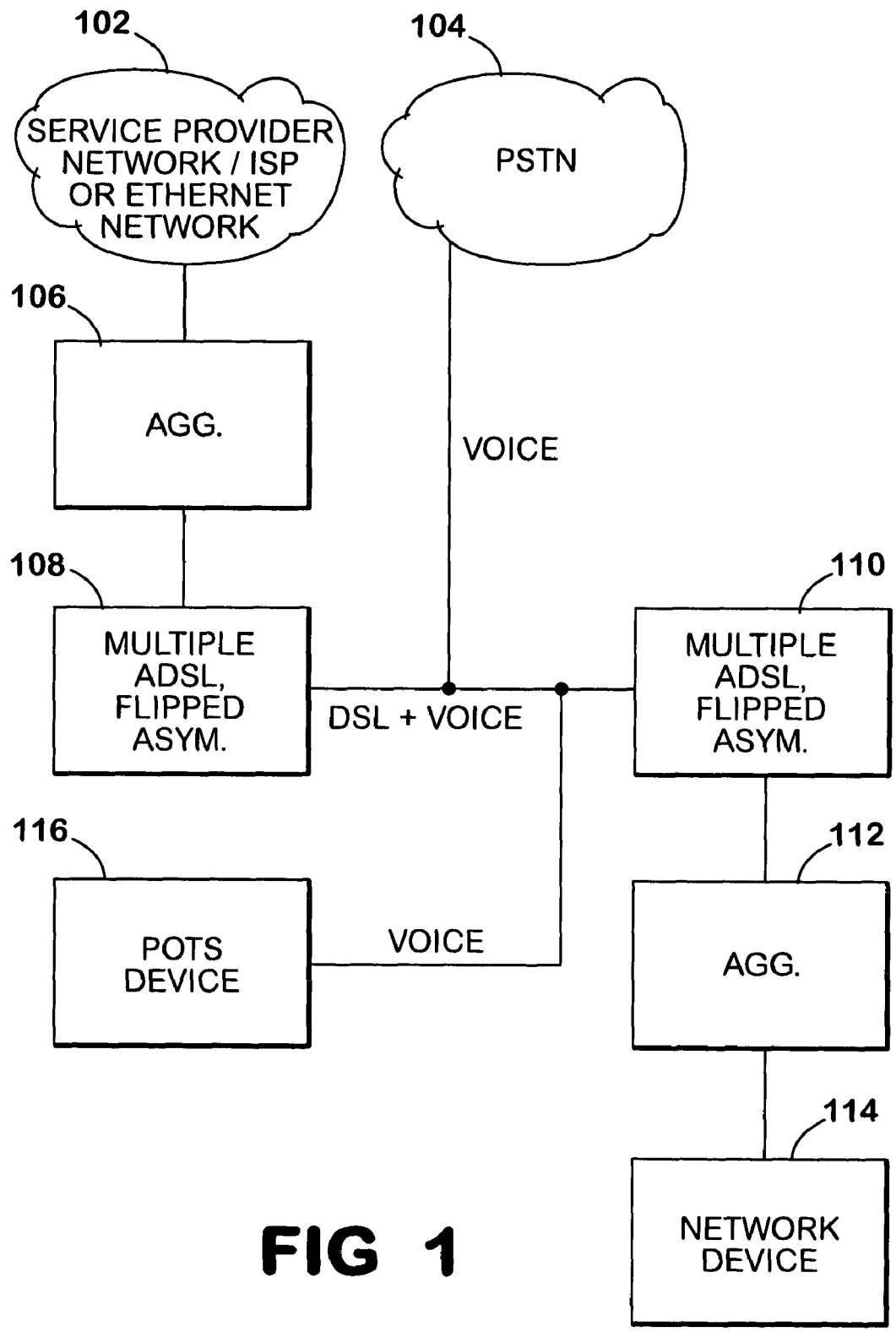
FIG. 1 is a high level view of a network access service from a service provider network to the subscriber that utilizes embodiments of the present invention to aggregate multiple ADSL modems and to provide a network access service from the service provider network to the subscriber.

FIG. 1 shows a high level view of a data service being provided from a service provider network 102 to a network device 114 of a subscriber. A service provider maintains the service provider network 102 that provides data services for subscribers. For example, the service provider network 102 may provide Ethernet services including access to an Ethernet network, such as a corporate LAN. The service provider network may alternatively perform as an Internet Service Provider ("ISP") providing broadband Internet accessibility. The service provider, or another service provider, may also provide access to the public switched telephone network ("PSTN") 104 for subscribers. As shown in FIG. 1, the broadband access is distributed to the subscriber from the service provider network 102 in various ways where higher level ATM, Ethernet, multilink PPP, and IP communication protocols are carried between the service provider and the subscriber over lower level aggregated DSL transports.

The communications utilizing the DSL transports are aggregated at an aggregator device 106 of the service provider network 102 so that multiple ADSL modems may be used to transfer the data between the subscriber and the service provider network. For example, a set of ADSL modems 108 contained within a DSL access multiplexer ("DSLAM") are aggregated at the aggregator device 106 and are used to transport the higher level data communications between a central office ("CO") of the service provider and out to the location of the subscriber. The data communications are received at another set of ADSL modems 110. The data communications are then converted back to the higher level communications received by another aggregator device 112 that aggregates the multiple ADSL modems 110. The aggregator device 112 provides communication with the network device 114 of the subscriber.

The communications may be provided to the subscriber as encapsulated in the lower level of communications through the DSL transport such that the multiple ADSL modems 110 reside at the subscriber location along with the aggregator device 112. As an alternative, the communications may be provided directly as a service to the subscriber such as by including the multiple ADSL modems 110 within the service provider network along with the aggregator device 112. In this alternative, the data connection extends from the aggregator device 112 of the service provider network into the location of the subscriber where the network device 114 may connect to the network access service.

The connection between the aggregator device 112 and the network device 114 may be dependent upon the particular type of network access service being provided to the subscriber. For example, where the network access service is Internet access, then the chain of connections between the ADSL modems 110, aggregator device 112, and network device 114 may be one of a variety of interfaces such as Ethernet, Universal Serial Bus ("USB"), or others. However, where the network access service being provided is an Ethernet service from an Ethernet network, then the connection between ADSL modems 110, aggregator device 112, and network device 114 should be Ethernet links.

The communications between the network device 114 and the network 102 may be either symmetric or asymmetric through the network access service, depending upon the configuration of the sets of ADSL modems 108 and 110. However, the configurations may be such that at least one of the ADSL modems at point 108 and at point 110 have a different upload and download speed than at least one other ADSL modem at point 108 and at point 110. For example, the communications may be made asymmetric by having ADSL modems 108 and 110 providing the asymmetry between the upload and download data transfer rates where the sum of the upload rates at point 108 or point 110 does not equal the sum of the download rates at point 108 or point 110. For example, ADSL modems 108 may include both type ATU-C and ATU-R modems but include more of one than the other. Likewise, ADSL modems 110 may also include type ATU-C and ATU-R modems but include more of one than the other, opposite the configuration at point 108. Thus, the download for the subscriber may be faster than the upload or the upload may be faster than the download, but there remains at least one ADSL modem at each point 108, 110 that has its asymmetry flipped relative to another ADSL modem at that same point.

Providing an upload speed faster than a download speed between the ADSL modems 108 and 110 may not be permitted under a regulatory scheme where copper communications extend from the ADSL modem 108 back to the network 102 and where the upload speed refers to an upload from the subscriber to the service provider network. However, the ADSL modems 108 may be positioned away from a CO to a point that is closer to the point of service where the ADSL modems 110 are positioned. Communications between the location of the ADSL modems 108 and the network 102 may then occur over fiber to avoid the faster upload speeds from creating copper networking issues.

The aggregated communications increase the available bandwidths of the data transfer directions. The aggregator device 106 is positioned between the DSLAM or other service point containing modems 108 and the downstream asynchronous transfer mode ("ATM") or other wideband link back to the remainder of the service provider network 102. The aggregator device 106 aggregates the communications of multiple (1-N) modems 108 that are in communication with multiple (1-N) modems 110. The multiple modems 110 are then aggregated by an aggregator device 112 located at a service point such as the subscriber point of service. Thus, the single data link accessible by the subscriber may benefit from the bandwidth of multiple ADSL modem connections to increase the effective bandwidth of the network access service being provided to the subscriber. This aggregation of data links is described below in more detail with reference to FIG. 2.

The aggregator device may be of various types that perform aggregation at one of various levels of the protocol stack. For example, the aggregator device may be an Ethernet switch that performs aggregation at the Ethernet level of the protocol stack. As another example, the aggregator may be a router that performs the aggregation at the Internet Protocol level of the protocol stack or alternatively at the multilink PPP level. Thus, it will be appreciated that various types of aggregator devices may be used.

The aggregated communications of the network access service shown in FIG. 1 may also co-exist with other conventional services such as plain old telephone service ("POTS"). For example, the DSLAM housing DSL modems 108 provides a splitter function to interconnect the ATM link back to the service provider network 102 with the DSL modems 108 for data communications while interconnecting voice links between the PSTN 104 and POTS device 116 of the subscriber. The voice links are passed through a filter-splitter on the subscriber end and also at the splitter function of the DSLAM so that the copper line pairs between the DSL modems 108 and DSL modems 110 may carry both the voice signals and the data signals while preventing the data signaling from being heard by the POTS devices 116.

Figure 2:
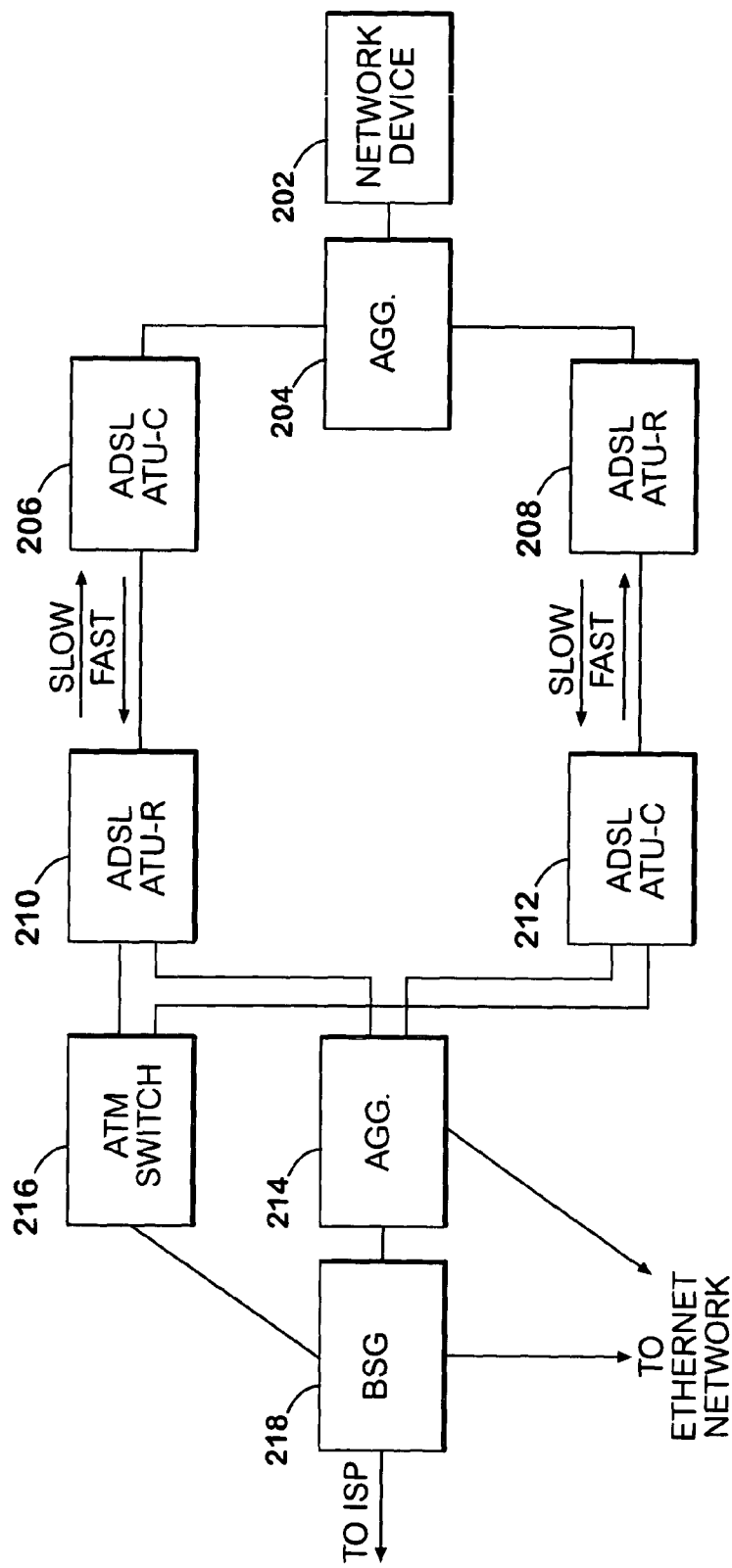
FIG. 2 is a diagram of the connectivity of a DSL configuration according to an embodiment of the present invention that utilizes multiple asymmetric DSL modems per service endpoint that may be used to achieve various bandwidth combinations including a symmetric bandwidth.

As shown in FIG. 2, the communications of a data link may be transferred by multiple lower level ADSL modems 206, 208 that communicate with distant multiple ADSL modems 210, 212. Where the network access service is asymmetric, the sum of upload speeds for the aggregated ADSL modems 206, 208 and 210, 212 differs from the sum of download speeds. However, the network access service may also be made symmetric by having the sum of upload speeds for the ADSL modems 206, 208 and 210, 212 being equal to the sum of the download speeds. As shown in FIG. 2, the combination of the ATU-R and ATU-C ADSL modem pairs at each endpoint results in a symmetric DSL service due to the sum of upload speeds substantially equaling (i.e., differing by up to only a small amount such as 10%) the sum of download speeds.

The subscriber has a network device 202 such as a router linked to a personal computer or such as a network interface card ("NIC") of the personal computer that utilizes a communications protocol. The data communications are exchanged between the network device 202 and an aggregator device 204. The aggregator device 204 then communicates with the two ADSL modems 206, 208 and aggregates the two modems 206, 208 for use by the network device 202. The aggregator device 204 may aggregate communications with the two modems 206, 208 in accordance with the link aggregation standard IEEE 802.1ad where the communications protocol in use between the aggregator 204 and the ADSL modems 206, 208 is the Ethernet protocol.

The ADSL modems 206, 208 then exchange communications with the ADSL modems 210, 212 over the copper lines between the RJ-11 phone line interfaces of the ADSL modems. The ADSL modems 210, 212 also communicate with an aggregator device 214 that aggregates the communications of the modems 210, 212 when exchanging communications with a downstream device such as an ATM switch 216 or broadband service gateway ("BSG") 218. The switching that provides for the aggregation of ADSL modem communications may alternatively be incorporated into the BSG 218 rather than utilizing an external aggregator device 214. Where the protocol in use by the aggregator device 214 is Ethernet, the data communications from the modems 210, 212 may be exchanged with the aggregator device 214 by a direct Ethernet interface for a DSLAM, by ATM interfaces through the ATM switch 216 (e.g., Ethernet over ATM encapsulation), or by interfaces from the BSG 218 (e.g., Ethernet, ATM, or Ethernet encapsulated over an Internet Protocol interface).

To optimize the aggregated ADSL modems, the aggregator devices 204, 214 may perform rate shaping and/or load balancing. The aggregator devices 204, 214 may perform rate shaping by directing frames of data according to the upload speed of the communications devices being aggregated by the aggregator device. Thus, the aggregator devices 204, 214 may store in memory any upload speed differential that may exist between the two ADSL modems connected to the ports of the aggregator device.

In the example of FIG. 2, the communications devices are ADSL modems where the asymmetry is flipped for the two modems at each endpoint so that a symmetric data transfer results. One aggregator device 204 aggregates an ATU-C ADSL modem 206 having a relatively faster upload speed with an ATU-R ADSL modem 208 having a relatively faster download speed. Likewise, aggregator device 214 aggregates an ATU-R ADSL modem 210 having a relatively faster download speed with an ATU-C ADSL modem 212 having a relatively faster upload speed. The ATU-R modems 208, 210 communicate with the ATU-C modems 212, 206, respectively, to establish the bi-directional data transfer. With this ADSL configuration, the differential in upload speeds for each aggregated pair of modems may be defined as 8 megabits per second upload for one communication device and 1.5 megabits per second upload for the other communication device, which results in a differential factor of 5.3. The aggregator device 204, 214 may then channel every sixth frame to the modem with the slow upload speed while the five preceding frames are channeled to the modem with the fast upload speed.

In addition to rate shaping, the aggregator devices of FIG. 2 may load balance between the ADSL modems being aggregated. The aggregator device communicates status information with the ADSL modems being aggregated to detect the amount of data that an ADSL modem has queued to transfer. If one of the ADSL modems has overly filled its queue relative to the other ADSL modem, such as due to frame retransmissions or other similar reasons, then more frames are temporarily directed to the other ADSL modem until the relative loads of each have become balanced. For example, where the aggregator device is a router, the router may be optimized to rate shape and load balance as discussed above, such as by modifying the equal cost multiple paths ("ECMP") code to account for the differential in upload speeds of the communications devices that are attached.

As discussed above, the subscriber is provided access to the service provider network through a network access service that utilizes multiple ADSL devices that are aggregated both on the subscriber side and on the service provider side where at least one of the ADSL devices has flipped asymmetry relative to another at the same point. Thus, the subscriber benefits from having multiple aggregated ADSL lines, and the DSL data service may be made symmetric through such aggregation of ADSL modems.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of providing network access service using DSL connectivity, comprising:
   providing a first asymmetric DSL modem configured to communicate at a faster download bandwidth than an upload bandwidth at a first service point;
   providing a second asymmetric DSL modem configured to communicate at a faster upload bandwidth than a download bandwidth at the first service point;
   providing a third asymmetric DSL modem configured to communicate at a faster upload bandwidth than a download bandwidth at a second service point, the third asymmetric DSL modem establishing data communication with the first asymmetric DSL modem;
   providing a fourth asymmetric DSL modem configured to communicate at a faster download bandwidth than an upload bandwidth at a second service point, the fourth asymmetric DSL modem establishing data communication with the second asymmetric DSL modem;
   aggregating the data communications of the first and second asymmetric DSL modems at the first service point, wherein aggregating the data communications of the first and second asymmetric DSL modems comprises aggregating the upload bandwidth and the download bandwidth of the first asymmetric DSL modem with the upload bandwidth and the download bandwidth of the second asymmetric DSL modem; and aggregating the data communications of the third and fourth asymmetric DSL modems at the second service point, wherein aggregating the data communications of the third and fourth asymmetric DSL modems comprises aggregating the upload bandwidth and the download bandwidth of the third asymmetric DSL modem with the upload bandwidth and the download bandwidth of the fourth asymmetric DSL modem.

2. The method of claim 1, wherein aggregating the data communications of the first and second asymmetric DSL modems at the first service point comprises utilizing an Ethernet switch interconnecting Ethernet connections of the first and second asymmetric DSL modems with an Ethernet connection of an Ethernet capable device.

3. The method of claim 2, wherein the Ethernet capable device comprises a router, and wherein the router is further connected to an Ethernet port of one or more computers.

4. The method of claim 2, wherein the Ethernet capable device comprises a computer with an Ethernet port.

5. The method of claim 1, wherein aggregating the data communications of the first and second asymmetric DSL modems at the first service point comprises utilizing a router interconnecting Ethernet connections of the first and second asymmetric DSL modems with an Ethernet connection to an Ethernet capable device.

6. The method of claim 5, further comprising rate shaping the data communications between the router and the first and second asymmetric DSL modems.

7. The method of claim 5, further comprising load balancing the data communications between the router and the first and second asymmetric DSL modems.

8. The method of claim 1, wherein aggregating the data communications of the third and fourth asymmetric DSL modems at the second service point comprises utilizing an Ethernet switch interconnecting Ethernet connections of the third and fourth asymmetric DSL modems with an Ethernet connection of an Ethernet capable device.

9. The method of claim 1, wherein aggregating the data communications of the third and fourth asymmetric DSL modems at the second service point comprises utilizing a router interconnecting connections of the third and fourth asymmetric DSL modems with a connection to a network device.

10. The method of claim 1, wherein a first resultant bandwidth of the aggregated uploads bandwidths of the first and second DSL modems is substantially equal to a second resultant bandwidth of the aggregated downloads bandwidths of the first and second DSL modems.

11. The method of claim 1, wherein aggregating the data communications of the first and second asymmetric DSL modems at the first service point comprises utilizing an Ethernet switch interconnecting Ethernet connections of the first and second asymmetric DSL modems with an Ethernet connection of a first Ethernet capable device and wherein aggregating the data communications of the third and fourth asymmetric DSL modems at the second service point comprises utilizing an Ethernet switch interconnecting Ethernet connections of the third and fourth asymmetric DSL modems with an Ethernet connection of a second Ethernet capable device.

12. A system of providing network access service using DSL connectivity, comprising:
a first asymmetric DSL modem configured to communicate at a faster download bandwidth than an upload bandwidth at a first service point;
a second asymmetric DSL modem configured to communicate at a faster upload bandwidth than a download bandwidth at a first service point;
a third asymmetric DSL modem configured to communicate at a faster upload bandwidth than a download bandwidth at a second service point, the third asymmetric DSL modem configured to establish data communication with the first asymmetric DSL modem;
a fourth asymmetric DSL modem configured to communicate at a faster download bandwidth than an upload bandwidth at a second service point, the fourth asymmetric DSL modem configured to establish data communication with the second asymmetric DSL modem;
a first aggregator device configured to aggregate the data communications of the first and second asymmetric DSL modems at the first service point, the first aggregator device being configured to aggregate the upload bandwidth and the download bandwidth of the first asymmetric DSL modem with the upload bandwidth and the download bandwidth of the second asymmetric DSL modem; and
a second aggregator device configured to aggregate the data communications of the third and fourth asymmetric DSL modems at the second service point, the second aggregator device being configured to aggregate the upload bandwidth and the download bandwidth of the third asymmetric DSL modem with the upload bandwidth and the download bandwidth of the fourth asymmetric DSL modem.

13. The system of claim 12, wherein the first aggregator device comprises an Ethernet switch interconnecting Ethernet connections of the first and second asymmetric DSL modems with an Ethernet connection of an Ethernet capable device.

14. The system of claim 13, wherein the Ethernet capable device comprises a router, and wherein the system further comprises one or more computers having an Ethernet port connected to the Ethernet switch.

15. The system of claim 13, wherein the Ethernet capable device comprises a computer with an Ethernet port.

16. The system of claim 13, wherein the Ethernet switch is configured to perform rate shaping of the data communications between the Ethernet switch and the first and second asymmetric DSL modems.

17. The system of claim 13, wherein the Ethernet switch is configured to perform load balancing of the data communications between the Ethernet switch and the first and second asymmetric DSL modems.

18. The system of claim 12, wherein the first aggregator device comprises a router interconnecting connections of the first and second asymmetric DSL modems with a connection to a network device.

19. The system of claim 12, wherein the second aggregator device comprises an Ethernet switch interconnecting Ethernet connections of the third and fourth asymmetric DSL modems with an Ethernet connection of an Ethernet capable device.

20. The system of claim 12, wherein the second aggregator device comprises a router interconnecting connections of the third and fourth asymmetric DSL modems with a connection to a network device.

21. The system of claim 12, wherein a first resultant bandwidth of the aggregated uploads bandwidths of the first and second DSL modems is substantially equal to a second resultant bandwidth of the aggregated downloads bandwidths of the first and second DSL modems.

22. The system of claim 12, wherein the first aggregator device comprises an Ethernet switch interconnecting Ethernet connections of the first and second asymmetric DSL modems with an Ethernet connection of a first Ethernet capable device and wherein the second aggregator device comprises an Ethernet switch interconnecting Ethernet connections of the third and fourth asymmetric DSL modems with an Ethernet connection of a second Ethernet capable device.

23. A system of providing substantially symmetric network access service using DSL connectivity, comprising:
- a first asymmetric DSL modem configured to communicate at a faster download bandwidth than an upload bandwidth at a first service point;
- a second asymmetric DSL modem configured to communicate at a faster upload bandwidth than a download bandwidth at the first service point, wherein the upload bandwidth of the second asymmetric modem is substantially equal to the download bandwidth of the first asymmetric modem and the download bandwidth of the second asymmetric modem is substantially equal to the upload bandwidth of the first asymmetric modem;
- a third asymmetric DSL modem configured to communicate at a faster upload bandwidth than a download bandwidth at a second service point, the third asymmetric DSL modem configured to establish data communication with the first asymmetric DSL modem;
- a fourth asymmetric DSL modem configured to communicate at a faster download bandwidth than an upload bandwidth at a second service point, the fourth asymmetric DSL modem configured to establish data communication with the second asymmetric DSL modem, and wherein the upload bandwidth of the fourth asymmetric modem is substantially equal to the download bandwidth of the third asymmetric modem and the download bandwidth of the fourth asymmetric modem is substantially equal to the upload bandwidth of the third asymmetric modem;
- a first aggregator device configured to aggregate the data communications of the first and second asymmetric DSL modems at the first service point, the first aggregator device being configured to aggregate the upload bandwidth and the download bandwidth of the first asymmetric DSL modem with the upload bandwidth and the download bandwidth of the second asymmetric DSL modem; and
- a second aggregator device configured to aggregate the data communications of the third and fourth asymmetric DSL modems at the second service point, the second aggregator device being configured to aggregate the upload bandwidth and the download bandwidth of the third asymmetric DSL modem with the upload bandwidth and the download bandwidth of the fourth asymmetric DSL modem.

24. The system of claim 23, wherein the first and second aggregator devices are Ethernet switches.

25. The system of claim 23, wherein the first and second aggregator devices are configured to perform rate shaping and load balancing.

* * * * *